United States Patent [19]

Comberg

[11] Patent Number: 4,564,866
[45] Date of Patent: Jan. 14, 1986

[54] OPTICAL PRINTER

[75] Inventor: Albert Comberg, Aachen, Fed. Rep. of Germany

[73] Assignee: U.S. Philips Corporation, New York, N.Y.

[21] Appl. No.: 444,414

[22] Filed: Nov. 24, 1982

[30] Foreign Application Priority Data

Nov. 26, 1981 [DE] Fed. Rep. of Germany ....... 3146872

[51] Int. Cl.$^4$ .............................................. H04H 1/22
[52] U.S. Cl. .................................... 358/302; 358/296; 350/96.25
[58] Field of Search ............... 358/901, 296, 293, 200, 358/206, 207, 302; 350/96.25

[56] References Cited

U.S. PATENT DOCUMENTS

| | | |
|---|---|---|
| 3,325,594 | 6/1967 | Goldhammer et al. ............ 358/200 |
| 3,365,580 | 1/1968 | Cannella .............................. 358/200 |
| 3,770,910 | 11/1973 | Rose et al. ......................... 358/200 |
| 4,352,550 | 10/1982 | Uchida ............................. 350/96.25 |

*Primary Examiner*—Edward L. Coles, Sr.
*Attorney, Agent, or Firm*—David R. Treacy

[57] ABSTRACT

The invention relates to an optical printer in which light signals emitted by an information-controlled light source are applied to a photosensitive record carrier via a mirror system and a circular-to-linear converter which consists of optical fibers. In order to improve the optical coupling between the light source and the record carrier and hence the printing quality, the mirror system comprises a conical mirror which opens in the direction of the circular-to-linear converter and which enables the light beam to be axially coupled into the circularly arranged ends of the optical fibers at the entrance of the circular-to-linear converter.

6 Claims, 2 Drawing Figures

OPTICAL PRINTER

BACKGROUND OF THE INVENTION

1. Field of the Invention

The invention relates to an optical printer, comprising an information-controlled light source, a mirror system which comprises a rotatable mirror and a circular-to-linear convertor which consists of optical fibers, the ends of said optical fibers being arranged in a circle which is concentric with the axis of rotation of the rotatable mirror at the entrance of said convertor while the ends of the optical fibers are arranged in a straight line opposite a photosensitive record carrier at the exit of said convertor.

2. Description of the Prior Art

From U.S. Pat. No. 3,770,910 a device is known for the recording of information which consists of a light source, a rotatable mirror and a circular-to-linear convertor which consists of optical fibers. Therein, the ends of the optical fibers which are arranged in a circular at the entrance of the convertor extend parallel to the axis of rotation of the rotatable mirror, their end faces being bevelled so that they enclose an angle of approximately 45° with respect to the light beam reflected by the rotatable mirror. Consequently, only a part of the light is coupled into the optical fibers.

It is the object of the invention to improve the optical coupling between the light source and the circular-to-linear convertor by reducing the loss of light. The loss of light is caused by reflection from the end faces of the optical fibers and by the re-emergence of light from the optical fibers because a part of the light coupled-in arrives on the coating of the optical fibers in an unfavorable direction.

To this end, the printer in accordance with the invention is characterized in that the mirror system comprises a further, conical mirror which opens towards the circular-to-linear convertor and whose symmetry axis coincides with a light beam from the light source and with the axis of rotation of the rotatable mirror, said conical mirror being arranged so that the light beam which is emitted by the light source and which is reflected by the rotatable mirror is axially coupled into each time one or more of the circularly arranged ends of the optical fibers at the entrance of the circular-to-linear convertor. It is an important improvement that by multiple deflection the light beam is coupled into the circular-to-linear convertor parallel to the circularly arranged ends of the optical fibers.

A preferred embodiment of the device in accordance with the invention is characterized in that the rotatable mirror is constructed by grinding the end face of a rotor shaft of an electric motor so as to have a plane surface finish. Such a mirror can be simply and inexpensively manufactured and avoids an increased moment of inertia of the rotor shaft, so that short starting times are ensured when the optical printer is switched on.

A further preferred embodiment of the device in accordance with the invention comprises a sensor for the position of the rotatable mirror, said sensor being electrically connected to the control circuit for the light source and to a drive for the record carrier. The sensor supplies the control circuit for the light source and the drive for the record carrier with the necessary pulses for correct operation of the optical printed, i.e. synchronized movement of the rotatable mirror and the record carrier.

A further embodiment of the device in accordance with the invention is characterized in that the light source is formed by a laser. The light beam is thus concentrated and the lens systems otherwise required for concentrating the light beam may be omitted.

Some embodiments of a printer in accordance with the invention will be described in detail hereinafter with reference to the drawings.

DESCRIPTION OF THE PREFERRED EMBODIMENTS

Figure 1:
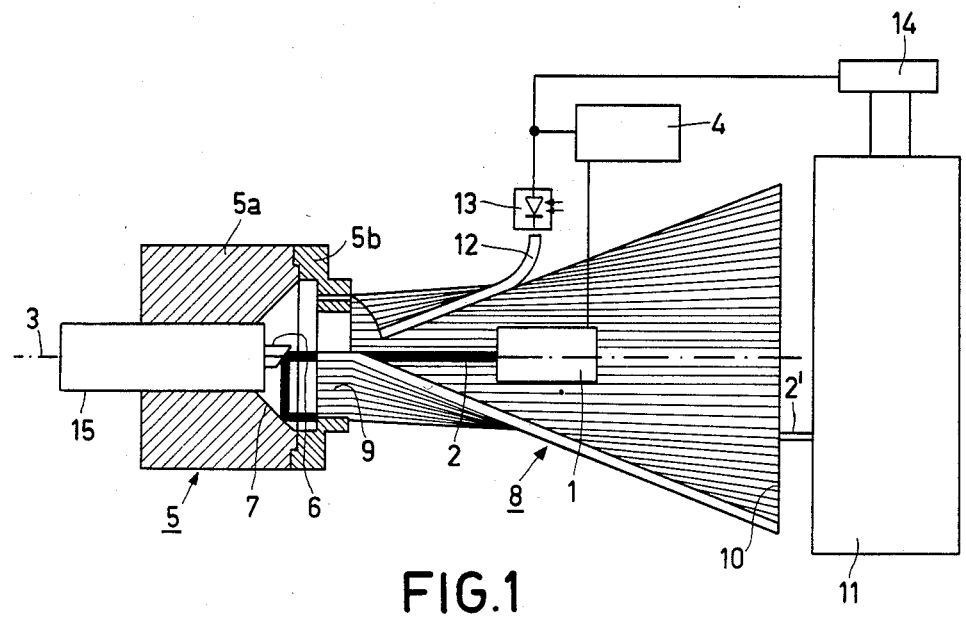
FIG. 1 diagrammatically shows an optical printer in which the light source and the circular-to-linear convertor are arranged at the same side of the mirror system.

FIG. 1 shows a light source 1 which emits a concentrated light beam 2 along an axis 3. The light source 1 is preferably a laser. It is electrically connected to a control circuit 4. The mirror system 5 comprises a rotatable mirror 6 whose axis of rotation coincides with the axis 3. The rotatable mirror 6 faces the light source 1 and encloses an angle of approximately 45° with respect to the light beam 2. The mirror system 5 furthermore comprises a conical mirror 7 whose symmetry axis also coincides with the axis 3. The mirror 7 is mounted to be stationary in the housing 5a of the mirror system 5 and may be constructed, for example, as a ground and metallized surface of a conical recess formed in the housing 5a, by milling. The mirror 7 opens towards a circular-to-linear convertor 8 which consists of optical fibers. At the entrance 9 of the circular-to-linear converter 8 tne ends of the optical fibers are arranged in a circle which is concentric with the axis 3. The entrance 9 is optically coupled to the mirror system 5. The annular entrance 9 of the circular-to-linear convertor 8 is mechanically connected, for example, by moulding to an annular, preferably plastic adapter 5b. The annular adapter 5b is mechanically connected to the housing 5a, for example, by way of a press fit. At the exit 10 of the circular-to-linear convertor 8 the ends of the optical fibers are arranged in a straight line opposite a photo-sensitive record carrier 11. The record carrier 11 is formed as a drum-shaped carrier whose surface is covered with a photo-sensitive foil. This and other embodiments of a photo-sensitive record carrier 11 are generally known and are not shown in detail in the figures. As appears from FIG. 1, the circular-to-linear convertor 8 partly encloses the light source 1; this arrangement of the individual components of the optical printer results in a compact construction. An optical fiber 12 of the circular-to-linear convertor 8 is coupled to a light receiver (sensor) 13, for example, a photodiode. The sensor 13 is electrically connected to the control circuit 4 and to a drive 14 for the drum of the photosensitive record carrier 11.

The light source 1 emits a concentrated light beam 2 to the rotatable mirror 6. The latter is formed, of example, directly as a plane end face of the rotor shaft of an electric motor 15 and reflects the light beam 2 so that it lands on the conical mirror 7. Other embodiments of a rotatable mirror 6, for example, a separate mirror which is mounted on a thin shaft, are also feasible. The conical mirror 7 reflects the light beam 2 once more, so that the light beam 2 is axially coupled into the entrance 9 of the circular-to-linear convertor 8, parallel to the circularly arranged ends of the optical fibers 9, each time into one or more of these ends. As is denoted by the reference numeral 2', the coupled-in light beam 2 emerges each time from the associated end (ends) of the relevant optical fiber (fibers) of the circular-to-linear convertor 8 and reaches the photo-sensitive record carrier 11 so that each time one point is exposed. The light source 1 is activated by the control circuit 4 which comprises devices for information input, storage and reading of the kind known from the field of techical data processing. The control circuit 4 also comprises a component which converts the information pulses read into control pulses for the light source 1 and which controls the intensity of the light beam (2, 2') in accordance with the image to be recorded on the photo-sensitive record carrier 11. Via the optical fiber 12, the light receiver 13 receives a light pulse each time when the light beam 2' has recorded a complete line of pixels on the record carrier 11, thus supplying information for determining the position of the rotatable mirror 6.

The light receiver 13 is electrically connected to the control circuit 4 so that the electric pulses despatched by the light receiver 13 can be used by the control circuit 4 for controlling the light source 1. The light receiver 13 is also electrically connected to the drive 14, so that the photo-sensitive record carrier 11 is advanced each time by one line when the light beam 2' has exposed a complete line of pixels on the photo-sensitive record carrier 11 and the light beam 2 is coupled into the optical fiber 12. When the number of revolutions of the shaft 6 is constant, a high-quality optical print is thus ensured.

Figure 2:
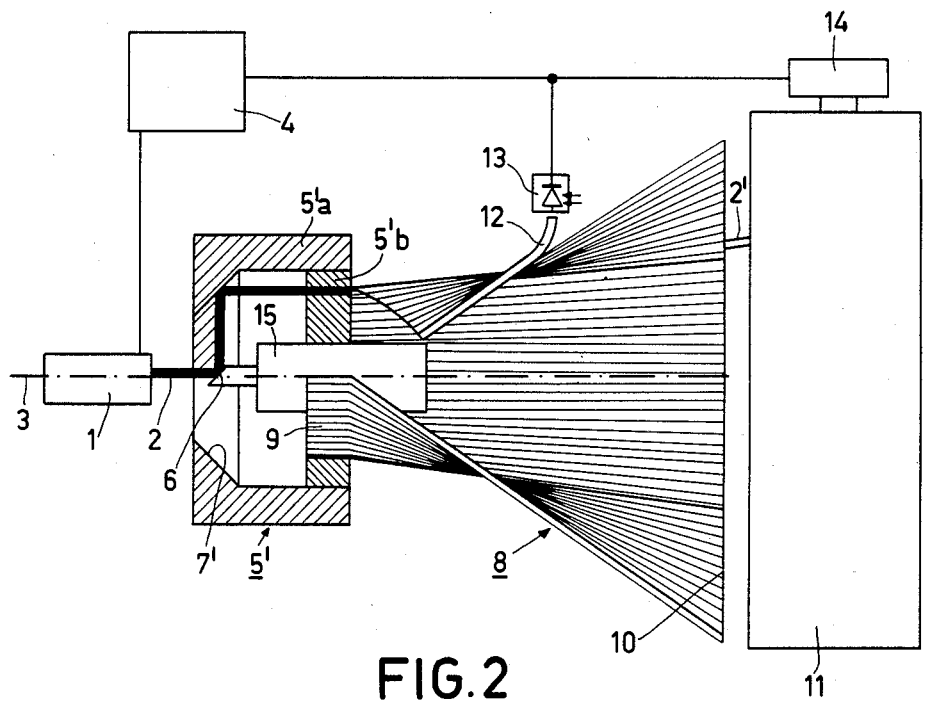
FIG. 2 diagrammatically shows an optical printer in which the light source and the circular-to-linear convertor are arranged at opposite sides of the mirror system.

FIG. 2 shows a further embodiment of the optical printer in accordance with the invention. Contrary to FIG. 1, the light source 1 and the circular-to-linear convertor 8 are arranged on opposite sides with respect to the mirror system 5'. The light beam 2 is deflected once by the rotatable mirror 6 and a second time by the conical mirror 7' in order to be coupled axially parallel into the circularly arranged ends of the optical fibers at the entrance 8 of the circular-to-linear convertor 8. The entrance 9 of the circular-to-linear convertor 8 is mechanically connected, for example, by moulding, to a preferably plastics annular part 5'b. Contrary to the embodiment shown in FIG. 1, the annular part 5'b also serves as a holder for the electric motor 15. The annular part 5'b is connected to the housing 5'a of the mirror system 5' by way of a press fit. The conical mirror 7' is arranged to be open towards the rotatable mirror 6. Except for the described differences, the printer shown in FIG. 2 is identical to the printer shown in FIG. 1.

What is claimed is:

1. An optical printer, comprising an information-controlled light source radiating a light beam along an axis; rotatable mirror means for reflecting the beam from said axis through an angle in a radial plane passing through said axis, said means including means for continuously rotating the angular position of said radial plane; a circular-to-linear convertor consisting of an array of optical fibers, each of said fibers having a first and a second end, the respective second ends being arranged in a straight line; and a photosensitive record carrier disposed opposite said second ends for receiving light from respective ones of the fibers,
characterized in that said first ends of said fibers are arranged parallel to each other in a circular cylindrical pattern coaxially about said axis, each first end having a face which is perpendicular to said axis, and
said printer comprises a conical mirror arranged coaxially about said axis, arranged to reflect said light beam into a selected at least one of said end faces corresponding to the instantaneous angular position of the rotatable mirror means.

2. A printer as claimed in claim 1, characterized in that said rotatable mirror means comprises an electric motor having a shaft coaxial with said axis, and a mirror surface formed by grinding an end face of the shaft to form a plane surface arranged obliquely with respect to said axis.

3. A printer as claimed in claim 1, characterized in that said rotatable mirror means and conical mirror form a mirror system, and said light source and convertor are disposed to a same axial side of the mirror system.

4. A printer as claimed in claim 1, characterized in that said rotatable mirror means and conical mirror form a mirror system, and said light source and convertor are disposed to opposite axial sides of the mirror system.

5. An optical printer, comprising an information-controlled light source radiating a light beam along an axis; rotatable mirror means for reflecting the beam from said axis through an angle in a radial plane passing through said axis, said means including means for continuously rotating the angular position of said radial plane; a circular-to-linear convertor consisting of an array of optical fibers, each of said fibers having a first and a second end, the respective second ends being arranged in a straight line; and a photosensitive record carrier disposed opposite said second ends for receiving light from respective ones of the fibers,
characterized in that said first ends of said fibers are arranged parallel to each other in a circular cylindrical pattern coaxially about said axis, each first end having a face which is perpendicular to said axis; and said printer comprises
a conical mirror arranged coaxially about said axis, arranged to reflect said light beam into a selected at least one of said end faces corresponding to the instantaneous angular position of the rotatable mirror means,
a control circuit for the light source,
drive means for driving said photosensitive record carrier,
sensor means for determining the angular position of the rotatable mirror means, and
means for electrically connecting the sensor means to said control circuit and said drive means.

6. A printer as claimed in claim 5, characterized in that said rotatable mirror means comprises an electric motor having a shaft coaxial with said axis, and a mirror surface formed by grinding an end face of the shaft to form a plane surface arranged obliquely with respect to said axis.

* * * * *